US007787154B2

(12) United States Patent
Fan et al.

(10) Patent No.: US 7,787,154 B2
(45) Date of Patent: Aug. 31, 2010

(54) FONT PRINTING SYSTEM HAVING EMBEDDED SECURITY INFORMATION COMPRISING VARIABLE DATA PERIODIC LINE PATTERNS

(75) Inventors: Zhigang Fan, Webster, NY (US); Reiner Eschbach, Webster, NY (US); Judith E. Stinehour, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 602 days.

(21) Appl. No.: 11/756,390

(22) Filed: May 31, 2007

(65) Prior Publication Data

US 2008/0296885 A1 Dec. 4, 2008

(51) Int. Cl.
*H04N 1/405* (2006.01)

(52) U.S. Cl. ....................... 358/3.28; 358/1.11; 358/3.2

(58) Field of Classification Search ............... 358/3.28, 358/1.9, 2.1, 3.06, 3.13, 3.2, 3.27, 534–536, 358/1.11, 1.12, 451, 468; 382/237, 270, 382/298–299; 283/91, 93, 113
See application file for complete search history.

(56) References Cited

U.S. PATENT DOCUMENTS

| | | | | |
|---|---|---|---|---|
| 4,597,593 | A * | 7/1986 | Maurer | 283/94 |
| 4,738,949 | A * | 4/1988 | Sethi et al. | 503/227 |
| 5,483,602 | A * | 1/1996 | Stenzel et al. | 382/135 |
| 2007/0204755 | A1* | 9/2007 | Moreau | 101/41 |

OTHER PUBLICATIONS

U.S. Appl. No. 11/313,397, filed Dec. 21, 2005, Eschbach.
U.S. Appl. No. 11/314,509, filed Dec. 21, 2005, Eschbach.

* cited by examiner

*Primary Examiner*—Thomas D Lee
*Assistant Examiner*—Stephen M Brinich
(74) *Attorney, Agent, or Firm*—Fay Sharpe LLP

(57) ABSTRACT

A method and system is provided for providing a variable data guilloché shaped pattern comprised of variable data differential line pattern fonts comprising decodable template symbols which are capable of being selectively assembled into a predetermined variable data code. The code representations are embedded in the guilloché pattern amongst a plurality of unvaried standard base patterns. The representation can be decoded with a digital scan capable of identifying the embedded patterns and communicated it to a user for verifying a document containing the code.

20 Claims, 6 Drawing Sheets

FONT PRINTING SYSTEM HAVING EMBEDDED SECURITY INFORMATION COMPRISING VARIABLE DATA PERIODIC LINE PATTERNS

CROSS REFERENCE TO RELATED APPLICATIONS

Cross reference is made to the following application filed concurrently with and incorporated by reference herein: U.S. application Ser. No. 11/756,375, filed May 31, 2007 entitled: "Variable Data Periodic Line Patterns For Composing A Font System".

Cross reference is also made in particular to the following pending applications: U.S. Ser. No. 11/313,397, filed Dec. 21, 2005, "Variable Differential Gloss Font Image Data", and U.S. Ser. No. 11/314,509, filed Dec. 21, 2005, "Printed Visible Fonts with Attendant Background".

TECHNICAL FIELD

The presently disclosed embodiments are directed to period line pattern printing systems particularly applied as background to humanly perceptible alphanumerical, graphical or pictorial information.

BACKGROUND

Since print systems have been in existence, printers have sought methods for inhibiting counterfeiting and unauthorized copying of printed documents. Enhanced complexity in an engraved pattern of a press plate is one such method that most people are familiar with as a result of its everyday observation in currency bills. Bank checks, security documents, bonds and other financial documents are other examples of printed documents having complex background patterns to inhibit unauthorized reproduction. Identification documents, e.g. passports, social security cards and the like, are other examples. Credit cards not only have complex background patterns, but now also have embedded holographics to enhance verification and authentication of such a card.

As far as printed documents are concerned, a common complex background pattern is a guilloché line pattern, i.e., an ornamental pattern or border consisting of lines flowing in interlaced curves. FIG. 5 is a check pattern exemplifying a guilloché. The guilloché patterns are designed to be hard to reproduce and thus can serve as a security feature. However, an associated disadvantage is that the applied pattern or information is often fixed in nature. Accordingly, the fixed nature of the pattern means that it is common and identical on all documents on which it is printed. Often it is preprinted on the document before the document is usually used (e.g., checks).

More particularly, even though such background patterns are designed to be hard to reproduce, at the same time, they are fixed, meaning every passport has the same pattern as all passports from that country, every monetary note has the same pattern as the same note from that country, any credit card has the same pattern, etc. This actually decreases the amount of security afforded by a guilloché since it is sufficient to re-create one pattern in order to counterfeit N credit cards. It would therefore be desirable and a substantial improvement to have a variable guilloché, where, for example, the credit card number is embedded in the guilloché and thus every credit card has a different pattern (to a decoder) while having the identical human visual impression.

There is a need for embedding security information that more particularly identifies a particular document in a unique manner so that whatever information is embedded is visually imperceptible to an intended counterfeiter or unauthorized copyist even for a single document produced in a print run of the one document only.

Glyph technology, cf. U.S. Pat. No. 5,449,896, is another well known security system which can uniquely identify a document, but the inclusion of a glyph code (or any bar coding system of that type) is easily humanly perceptible for its inclusion on the document, although the meaning of the glyph itself is generally only machine decodable.

There also exist various digital watermarking methods that embed information into images. However, most such methods were designed mainly for continuous-tone pictorial type images. They often modulate the intensity (color) of individual pixels. When applied to line patterns, these methods result in isolated pixels that cannot be reliably printed.

One common aspect of all such security feature applications is the addition of some kind of information into the document that prevents/hinders alterations and counterfeiting.

There is thus a need for a system which better hides security data within a printed document, and that which can embed security data unique to that particular document so that the security information is successfully implemented for even a document production run of one document.

SUMMARY

According to the aspects illustrated herein, a guilloché is created that encompasses fully variable data that can be created in real time. A tessellation of small base guillochés creates a large guilloché, but respective ones of the base guillochés are distorted to correspond to a vocabulary element. A set of such distorted base guillochés are formed to span an available coding vocabulary for vector encoding (multi-bit per element) of a printed document.

Accordingly, there is provided a system and method comprising a variable data guilloché font pattern, particularly useful as embedded security data in a printed document. A periodic line base pattern has an exterior portion configured for seamless tilable association in a congregated plurality of the base patterns to form the guilloché pattern. An interior portion of the base pattern comprises a variable line pattern distortion wherein a plurality of distinctive ones of the variable distortions respectively correspond to a set of predetermined template symbols. An arrangement of the template symbols appears as a common guilloché pattern that actually comprises predeterminable and decodable security data for the printed document.

Another disclosed feature of the embodiments is a font system comprised of a plurality of distinguishable line patterns respectively representative of a plurality of distinguishable symbols wherein each of the line patterns has an exterior portion and an interior portion. The exterior portion is identical for each of the line patterns for seamless tilable association. The interior portion includes an identifiable distortion representative of a corresponding distinguishable symbol. The distortion is identifiable through digital decoding upon scanning of a document including the font system. A user can then verify the authenticity of the printed document from the decoding.

DETAILED DESCRIPTION

As noted above, periodic line patterns, such as guilloché patterns, are commonly used in graphic design for security documents such as checks and currency notes.

Figure 1:
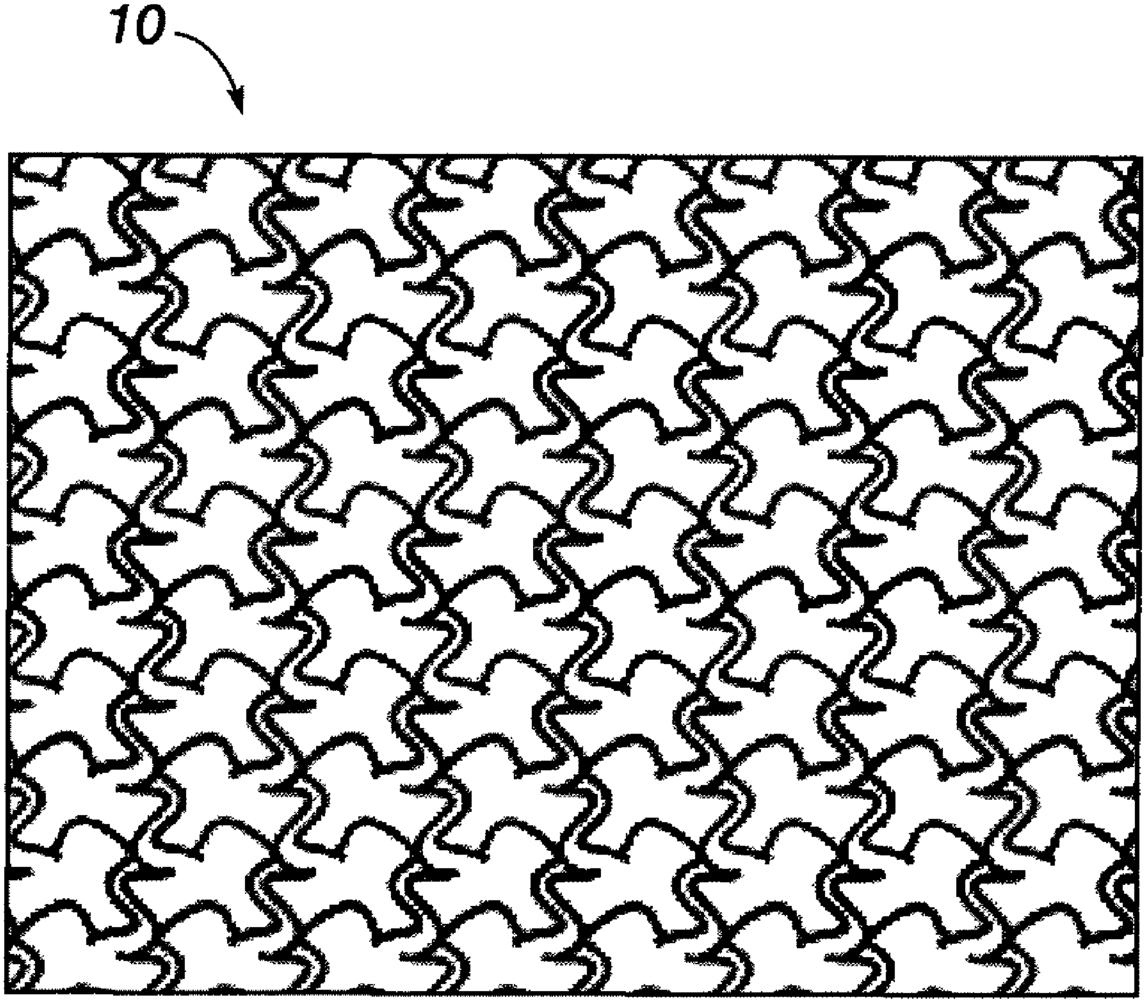
FIG. 1 is a periodic line pattern, such as a guilloché pattern comprised of repetitions of a base pattern element.
Figure 2:
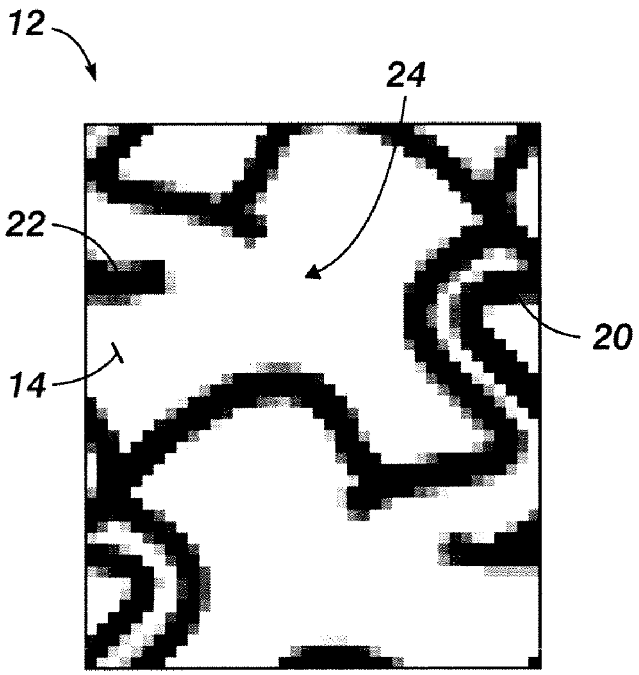
FIG. 2 is a representation of the base pattern element comprising FIG. 1.

By definition, a period pattern can be generated by a repetition or tessellation of a rectangular "base pattern", although other space tiling shapes and tile shifts/offsets are also possible and considered within the scope of this description. The base pattern has the property that there is no artificial discontinuity if two base patterns are placed next to each other, whether in a horizontal or vertical direction. FIG. 1 is an example of period pattern 10, and FIG. 2 shows a base pattern 12 (enlarged) for FIG. 1. FIG. 1 is thus a seamless, tilable association of the base pattern of FIG. 2. It is evident from FIG. 1 that the term "line pattern" used throughout this description is considered to be general, encompassing classical line patterns created in the guilloche process, as well as figurative patterns, icons and the like.

The base pattern is comprised of an exterior portion 14 of the pattern frame boundary wherein the line patterns have terminal ends 20 that will be matingly aligned with another terminal end 22 wherein a plurality of the base patterns 12 are congregated in a plurality of adjoining repetitions. The base pattern 12 also has an interior portion 24 spaced inwardly from the side walls of the base pattern, but the lines of the interior portion are also mostly seamlessly aligned with the lines of the exterior portion to similarly avoid readily apparent line discontinuities in the pattern arrangement.

Figure 3:
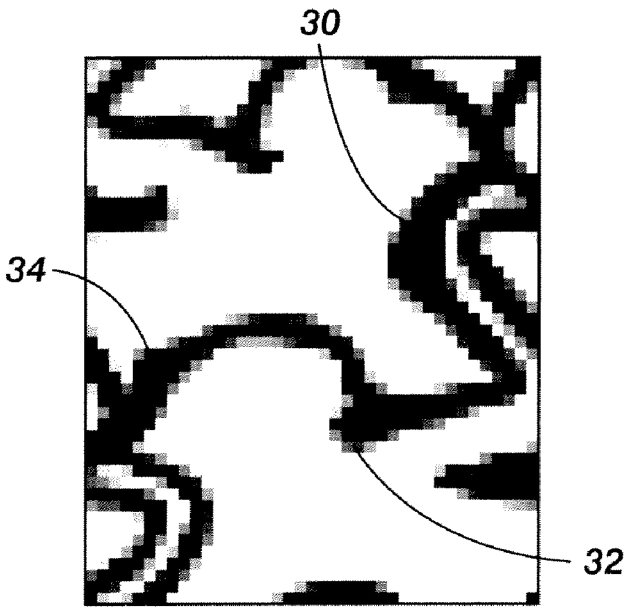
FIG. 3 is a line pattern comprising a geometric distortion of the base pattern of FIG. 2.

FIG. 3 comprises a distortion of the base pattern of FIG. 2. Even in the enlarged versions of FIGS. 2 and 3, only with a close inspection and comparison between FIGS. 2 and 3 can one identify the distortion occurring at points 30, 32 and 34. However, the distortions are significant enough to be discernible with the scanning in a digitized coding of FIG. 3.

A disclosed feature of the present embodiments is that a plurality of distinctive distortions, similar to FIG. 3, but individually or collectively discernible, are set to correspond to a set of symbols, i.e. an alphabet of templates, so that by embedding in the document a set of such distorted base patterns, the desired security or identifying data is included in the printed document.

Thus, such subtle geometric distortions in the line patterns though virtually imperceptible to the human eye when printed on a normal scale, can be effectively implemented as a font alphabet of any number of symbols.

The embedding process includes two parts: 1) template generation to produce a set of period line pattern templates; and 2) symbol embedding to insert the patterns that represent the input symbols into the documents. The former is performed once by the system designers, typically offline, while the latter is performed by the users at document creation time.

During template creation, a set of N templates, where N is the number of symbols to be embedded, is created such that each template resembles the base pattern in general, but differs from the base pattern in minute details. This can be accomplished by slightly modifying the base pattern. There are various methods of doing that. The following is one desired embodiment.

After a base pattern is selected 40 (FIG. 4), an M×K grid is imposed on the base pattern, where M, and K are the number of grid points contained in the base pattern in horizontal and vertical directions, respectively. The grid points are indexed by (m,k), where $0 \leqq m < M$ and $0 \leqq k < K$. For each interior grid point (m, k) such that $d \leqq m \leqq M-d$, $d \leqq k < K-d$, where d is a predetermined small positive integer, two random numbers r_x(m,k) and r_y(m,k) are generated. A template, the same size as the base pattern, is generated by locally shifting the basic pattern as follows: 1) if the pixel is on an interior grid point (m, k), the pixel is shifted by [r_x(m,k), r_y(m,k)]; 2) if the pixel is on a boundary (non-interior) grid point, no shift is performed; 3) if the pixel is not on the grid, its shift is an interpolation of the shifts of its four nearest neighboring grid points. Any standard interpolation method can be applied such as to bi-linear interpolation. Specifically, $\underline{S}_{xy}$, the shift vector for pixel (x, y) is determined as:

$$\underline{S}_{xy} = \alpha\beta\underline{S}_{ij} + \alpha(1-\beta)\underline{S}_{(i+1)j} + (1-\alpha)\beta\underline{S}_{i(j+1)} + (1-\alpha)(1-\beta)\underline{S}_{(i+1)(j+1)}$$

where $\underline{S}_{ij}$, $\underline{S}_{(i+1)j}$, $\underline{S}_{i(j+1)}$, and $\underline{S}_{(i+1)(j+1)}$ are the shift vectors for the top left, bottom left, top right, and bottom right grid points, respectively. Coefficients α and β are obtained as:

$$\alpha = x/s_x - i$$

$$\beta = y/s_y - j$$

where $S_x$ and $S_y$ are the distances between the neighboring grid points for horizontal and vertical directions, respectively.

The template generated 42 by the above procedure is a slightly distorted version of the base pattern. By varying random numbers, N templates can be produced. Since the pixels close to the boundaries of the patterns are not shifted, the border areas of the templates are the same as the base patterns. Consequently, when two templates are placed next to each other, there is no obvious discontinuity. FIG. 3 is an exemplar template pattern generated for the base pattern given in FIG. 2.

If the document design contains multiple sets of periodic line patterns, information can be embedded into each of them independently, as long as the patterns are separable in color.

Once the template patterns are generated, symbol embedding is straightforward by associating 44 (i.e. arranging in a predetermined order to comprise a secondary code) distorted base patterns with template symbols to form the first system. For example, the symbols could correspond to keyboard alphanumerics. For each symbol to be embedded, the template pattern that represents the symbol is used to replace the original period pattern.

Figure 6:
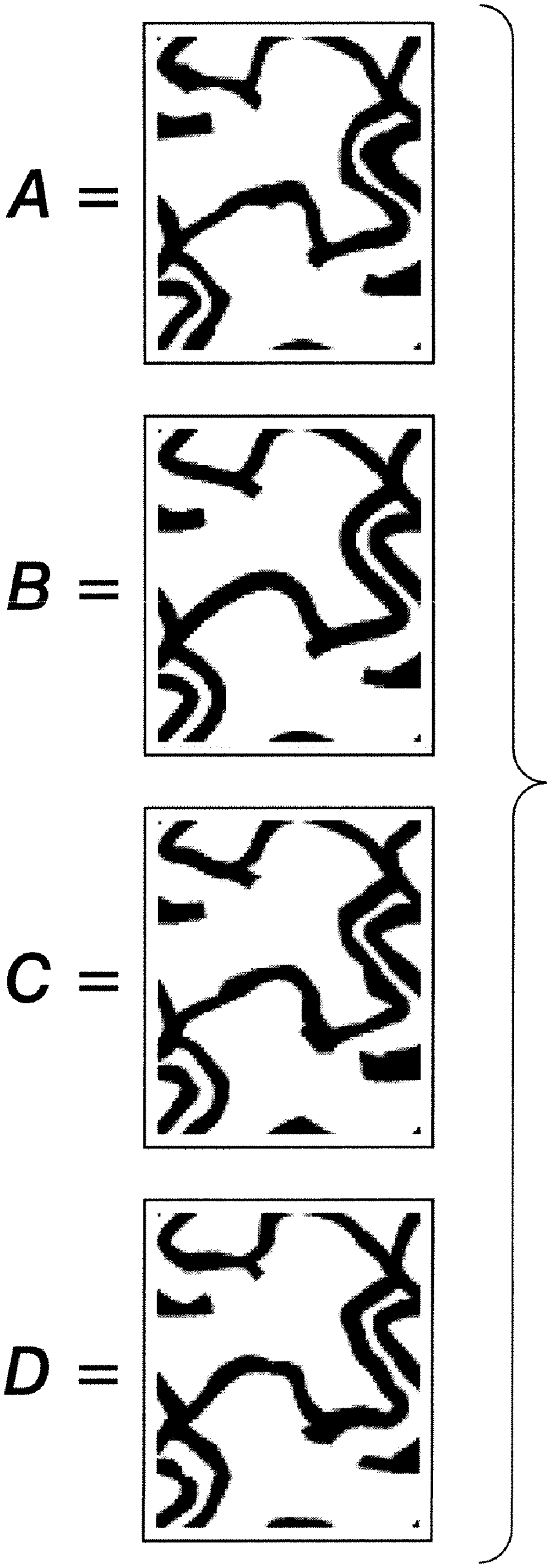
FIG. 6 is a set of four distinct template patterns exemplary associated with letters A, B, C, D, respectively.
Figure 7:
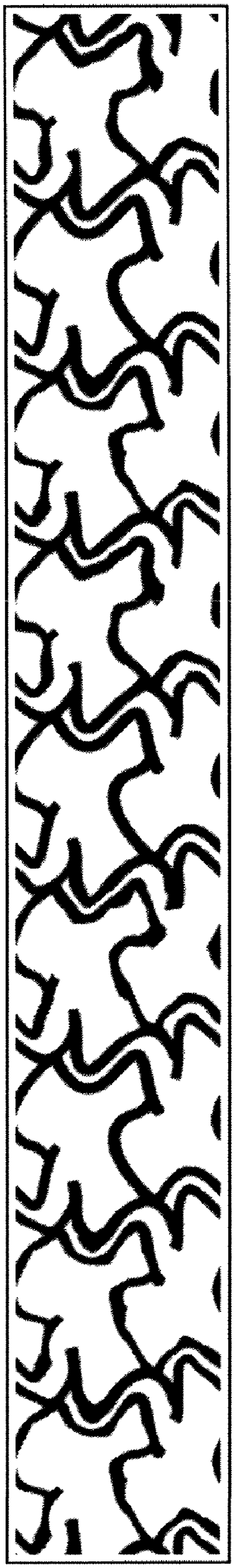
FIG. 7 is a sequencing of the codes of FIG. 6 to form the sequence codes AABCBDABD.

With reference to FIGS. 6 and 7, it can be seen that four different line pattern distortions have been generated as distinctive templates to be associated with the letters A, B, C, and D respectively. In FIG. 7, a sequence of the different templates of FIG. 6 have been lined to form a pattern of AABCBDABD, although the guilloché pattern corresponding to the sequence is virtually imperceptible to a human viewer and would be nearly impossible to appreciate in a much smaller scale.

Figure 4:
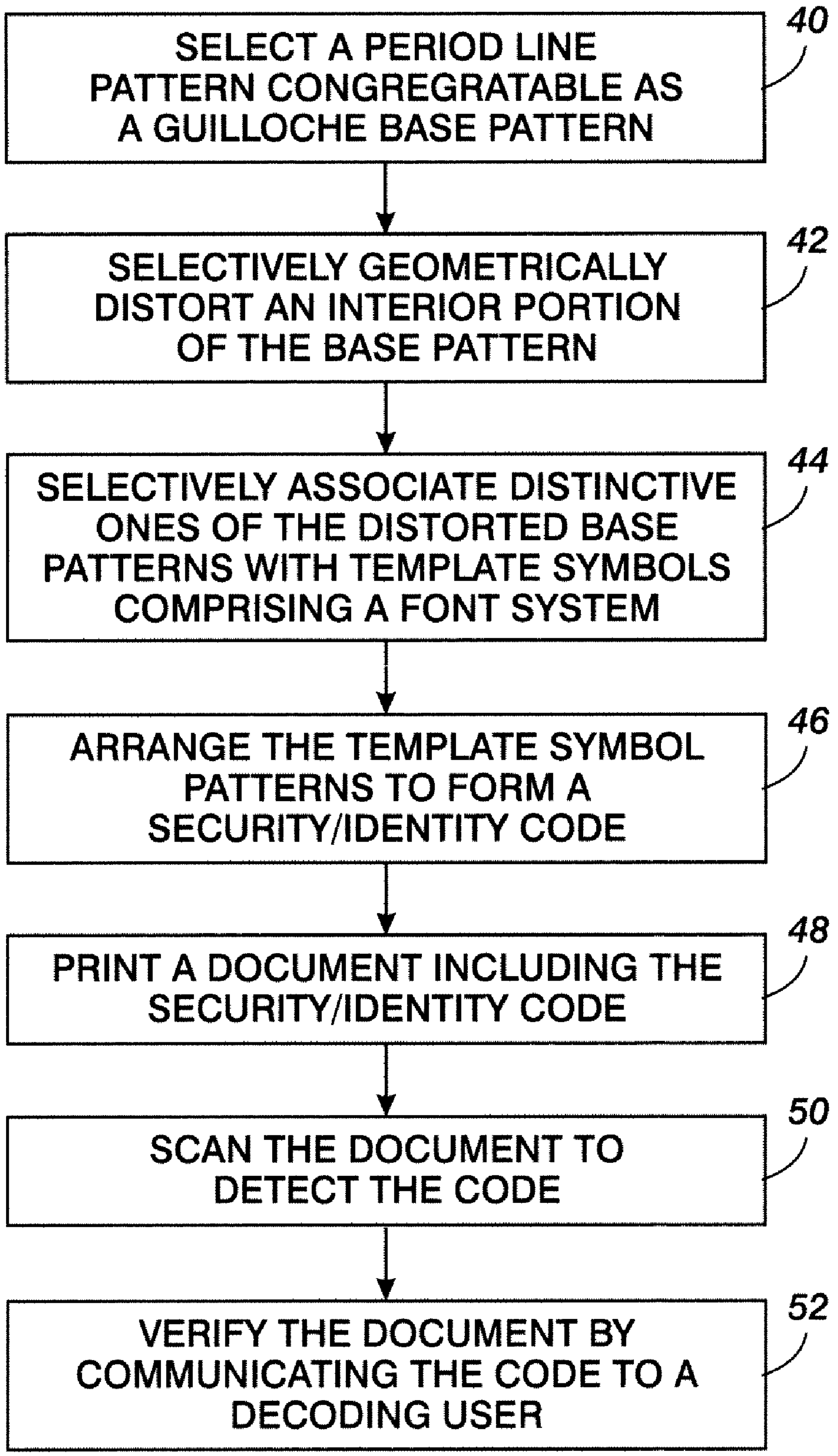
FIG. 4 is a flow chart illustrating a method for using the subject font system.

With continued reference to FIG. 4, FIG. 7 thus comprises an arrangement 46 of the template symbol patterns to form a desired security/identity code. This security code can be embedded by printing in a document (see FIG. 5) the security code somewhere in the overall initial guilloché pattern where most of the pattern comprises baseline patterning. Only the security code comprises the distorted baseline patterns comprising the different templates.

The embedded information can be recovered, when the document is digitized. The retrieval process contains two steps: line extraction and template matching.

After the document is scanned 50 and digitized, the periodic line patterns are extracted. As the color of the line patterns are typically quite distinguishable from the paper background and the other parts of the document, they can be easily obtained using thresholding or a simple color distance comparison. Specifically, a pixel is determined to be a part of the line pattern if the distance between its color and the line pattern color is smaller than a predetermined threshold. If multiple period patterns are involved, each of them can be extracted separately, using the above procedure.

The extracted line patterns are then divided into disjoint rectangular blocks, each with the same size as the basic pattern. Each block is then matched to the N templates. Almost any standard template matching method can be applied here. To take care of possible registration error between the template and the data, the template is shifted in both horizontal and vertical directions for −R to R pixels, where R is a predetermined positive integer. The symbol associated with the template with the highest matching score under the best registration position is determined as the detected symbol. Specifically, $$\text{DectectedSymbol}=\text{argMax}_{0<n<N}\text{Max}_{-R<shift\_x<R,-R<shift\_y<R}\text{matchscore}[\text{data, template(n), shift\_x, shift\_y}]$$

Figure 5:
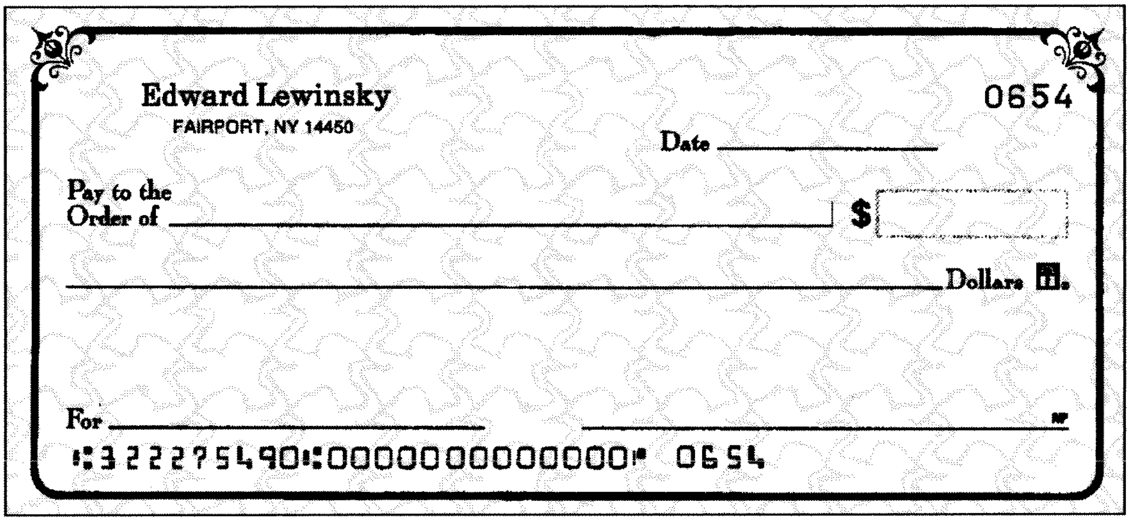
FIG. 5 is a bank check comprising a background line pattern including a font system of distorted base patterns recognizable as security or identity information.

FIG. 5 shows an exemplar check, with the name of the check owner embedded. Thus, enough distinctive template symbols are embedded in the seemingly consistent repetition of the base pattern, that the security information is included but effectively hidden.

The document can then be verified 52 by communicating the detected code to a decoding user. Both the code embedding and detecting can be accomplished in real time.

The retrieved information can be used for many different purposes, which include authentication (e.g., comparing the embedded name information with the name on the check), process control (e.g., routing a check), and banking automation (e.g., recording the dollar amount of a check into the user's account). The subtle geometric distortions in the line patterns comprising the embedded information does not introduce printability problems and is easily implementable within conventional printing systems.

The claims can encompass embodiments in hardware, software, or a combination thereof.

The word "printer" as used herein encompasses any apparatus, such as a digital copier, bookmaking machine, facsimile machine, multi-function machine, etc. which performs a print outputting function for any purpose.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of encoding a variable data guilloché pattern comprising:

creating a font system including a base pattern and selected geometric variations of the base pattern wherein the selected geometric variations are respectively associated with decodable symbols capable of being selectively assembled into predetermined variable data;

assembling the corresponding geometric variations of the base pattern as a predetermined representation of the variable data;

embedding the representation in a guilloché comprised of a plurality of the base patterns; and, decoding the representation from the guilloché for recognizing the variable data.

2. The method of claim 1 wherein the embedding comprises disposing the assembled representation of the variable data in the guilloché wherein the geometric variations are substantially imperceptible to a human observer.

3. The method of claim 1 wherein the assembling the representation occurs in real time with a printing of a document comprising the variable data guilloché pattern.

4. The method of claim 1 wherein the embedding comprises printing a document comprising the variable data guilloché pattern.

5. The method of claim 4 wherein the printing comprises executing a product run of one.

6. The method of claim 1 wherein the decoding comprises digitizing the variable data guilloché pattern.

7. The method of claim 6 wherein the decoding comprises detecting the selected geometric variations from the digitized variable data guilloché pattern.

8. The method of claim 7 further including translating the detected geometric variations to corresponding decodable symbols.

9. The method of claim 8 further including communicating the translated variable data to a decoding user.

10. The method of claim 9 further including determining by the decoding user if the translated variable data authenticates a printed document including the variable data guilloché pattern.

11. A printing system including an electronically stored variable data guilloché font representation residing in a memory for use in securing or identifying a document printed by the printing system comprising:

a repeatable base pattern formed for association as a tessellated plurality of base patterns including a guilloché pattern;

a set of distinguishable variations of the base pattern, each respectively corresponding to a decodable symbol for disposal within the tessellated plurality, to present a visionally imperceptible difference in the guilloché pattern; and, a document printed by the printing system including a predetermined assembly of the distinguishable variations comprising a font pattern useful for identifying or authenticating the printed document.

12. The printing system of claim 11 further including a decoding system for digitizing the printed document and recognizing a disposal of any font representations therein.

13. The printing system of claim 11 wherein the distinguishable variations comprise geometric distortions to interior portions of the repeatable base pattern.

14. The printing system of claim 11 wherein the distinguishable variations are spaced from edge portions of the base pattern wherein the tessellated plurality of lock line discontinuity with adjacent ones of the base pattern forming the predetermined assembly.

15. A variable data guilloché pattern particularly useful as embedded security data in a printed document, comprising;

a base pattern having an exterior portion configured for seamless tilable association in an associated plurality of the base patterns to form the guilloché pattern, and an interior portion comprised of a variable pattern distortion wherein a plurality of distinctive ones of said variable distortions disposed within a plurality of the base patterns respectively correspond to a set of predetermined template symbols; and, an arrangement of selected ones of base patterns comprising preselected ones of the template symbols wherein the arrangement is recognizable as the security data for the printed document.

16. The variable data guilloché pattern of claim 15 wherein the arrangement of the base patterns comprises a decodable sequence of template symbols.

17. A xerographic printing system comprising a font system comprised of a plurality of distinguishable line patterns respectively representative of a plurality of distinguishable symbols wherein each of the line patterns has an exterior portion and an interior portion, the exterior portion being identical for each of the line patterns for seamless tiling association, and the interior portion including an identifiable distortion representative of a corresponding distinguishable symbol, wherein the distortion is identifiable through digital decoding upon scanning of a document including the font system.

18. The xerographic printing system of claim 17 wherein the identifiable distortion comprises a local shift of a line pattern portion in the interim portion of the line pattern.

19. The xerographic printing system of claim 17 wherein the identifiable distortion is derived from a first base pattern and the distinguishable line patterns comprise a set of correlated first base pattern distortions, respectively comprising representations of a set of the corresponding distinguishable symbols.

20. The xerographic printing system of claim 17 wherein the identifiable distortion comprises an arbitrary modification to a first base pattern and a set of the arbitrary modifications is respectively assigned with a set of the corresponding distinguishable symbols.

* * * * *